(12) United States Patent
Batchelder et al.

(10) Patent No.: US 10,889,068 B1
(45) Date of Patent: Jan. 12, 2021

(54) ROTATIONAL POSITION ERROR COMPENSATION OF PRINT HEADS IN A 3D PRINTER AND METHODS THEREOF

(71) Applicant: Stratasys, Inc., Eden Prairie, MN (US)

(72) Inventors: J. Samuel Batchelder, Somers, NY (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 543 days.

(21) Appl. No.: 15/287,057

(22) Filed: Oct. 6, 2016

(51) Int. Cl.
  *B29C 67/00* (2017.01)
  *B33Y 30/00* (2015.01)
  *B33Y 50/02* (2015.01)
  *B29K 105/00* (2006.01)

(52) U.S. Cl.
  CPC ...... *B29C 67/0088* (2013.01); *B29C 67/0055* (2013.01); *B33Y 30/00* (2014.12); *B33Y 50/02* (2014.12); *B29K 2105/0067* (2013.01)

(58) Field of Classification Search
  CPC ......... B33Y 10/00; B33Y 30/00; B33Y 50/00; B33Y 50/02
  See application file for complete search history.

(56) References Cited

U.S. PATENT DOCUMENTS

| | | | |
|---|---|---|---|
| 6,722,872 B1 | 4/2004 | Swanson et al. | |
| 7,127,309 B2 | 10/2006 | Dunn et al. | |
| 7,374,712 B2 | 5/2008 | Swanson et al. | |
| 7,938,356 B2 | 5/2011 | Taatjes et al. | |
| 8,985,497 B2 | 3/2015 | Mannella et al. | |
| 9,073,263 B2 | 7/2015 | Mannella et al. | |
| 9,108,360 B2 | 8/2015 | Comb et al. | |
| 9,238,329 B2 | 1/2016 | Swanson et al. | |
| 2001/0038705 A1* | 11/2001 | Rubbert | A61C 7/00 382/128 |
| 2015/0352653 A1* | 12/2015 | Albrecht | B23K 9/0026 219/124.22 |
| 2016/0236418 A1* | 8/2016 | Armani | B29C 47/12 |
| 2017/0312987 A1* | 11/2017 | Ladanyi | B33Y 30/00 |

FOREIGN PATENT DOCUMENTS

WO    WO-2016082036 A1 * 6/2016 ............. B33Y 30/00

* cited by examiner

*Primary Examiner* — Ryan M Ochylski
(74) *Attorney, Agent, or Firm* — Westman, Champlin & Koehler, P.A.

(57) ABSTRACT

A 3D printer is configured to print a 3D part. The 3D printer includes a print head carried by a head gantry and configured to operably move the print head along planar tool paths. The 3D printer includes at least one head gantry actuator coupled to the head gantry and configured to move the print head in a plane and a print head actuator coupled to the print head and configured to move the print head in a direction substantially orthogonal to the plane. A sensor is fixedly mounted to the print head and configured to output a first signal that is directly or indirectly related to an acceleration of the print head, and a gyroscope is fixedly mounted to the print head and configured to output a second signal related to a rotational position of the print head. The 3D printer includes a controller configured to determine a rotational position error of the print head relative to a predetermined position based on the first signal and the second signal and to output one or more signals to the at least one head gantry actuator and/or the print head actuator to compensate for the rotational position error of the print head.

18 Claims, 5 Drawing Sheets

ROTATIONAL POSITION ERROR COMPENSATION OF PRINT HEADS IN A 3D PRINTER AND METHODS THEREOF

BACKGROUND

The present disclosure relates to 3D printers for printing three-dimensional (3D) parts and support structures. In particular, the present disclosure relates to compensating for position error of print heads when utilizing low mass gantries in additive manufacturing systems.

Additive manufacturing, also called 3D printing, is generally a process in which a three-dimensional (3D) object is built by adding material to form a 3D part rather than subtracting material as in traditional machining. One basic operation of an additive manufacturing system consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an additive manufacturing system, commonly referred to as 3D printer.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure includes a 3D printer configured to print a 3D part in a layer by layer manner. The 3D printer includes a print head carried by a head gantry and configured to operably move the print head. The 3D printer includes at least one head gantry actuator coupled to the head gantry and configured to move the print head in a plane and a print head actuator coupled to the print head and configured to move the print head in a direction substantially orthogonal to the plane. A sensor is fixedly mounted to the print head and configured to output a first signal that is directly or indirectly related to an acceleration of the print head, and a gyroscope is fixedly mounted to the print head and configured to output a second signal related to a rotational position of the print head. The 3D printer includes a controller configured to determine a rotational position error of the print head relative to a predetermined position based on the first signal and the second signal and to output one or more signals to the at least one head gantry actuator and/or the print head actuator to compensate for the rotational position error of the print head.

Another aspect of the present disclosure includes a 3D printer configured to print a 3D part in a layer by layer manner. The 3D printer includes a print head carried by a head gantry and configured to operably move the print head. The print head is configured to form layers of the 3D part based upon a sliced 3D model wherein a planar slice of the 3D model includes one or more planar tool paths. The 3D printer includes at least one head gantry actuator coupled to the head gantry and configured to move the print head in the plane and a print head actuator coupled to the print head and configured to move the print head in a direction substantially orthogonal to the plane. A sensor is fixedly mounted to the print head and configured to output a first signal that is directly or indirectly related to an acceleration of the print head, and a gyroscope is fixedly mounted to the print head and configured to output a second signal related to a rotational position of the print head. The 3D printer includes a controller configured to receive the first and second signals and determine a rotational position error of the print head relative to a predetermined position based upon the one or more tool paths in the slice of the 3D model and to output the rotational position error to a compiler that utilizes the rotational position error to modify the first signal to the at least one head gantry actuator and the second signal to the print head actuator to minimize rotational position errors of the print head when another 3D part is printed utilizing the 3D model.

Another aspect of the present disclosure includes a method of determining rotational position error in a print head of an additive manufacturing system. The method includes receiving a first signal from an accelerometer attached to the print head in a fixed location wherein the first signal is directly or indirectly related to an acceleration of the print head and receiving a second signal from a gyroscope attached to the print head in a fixed location. The method includes determining a rotational position of the print head based upon the first output received from the accelerometer and the second output received from the gyroscope.

Definitions

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

The term "print head" or "print heads" used herein include any equipment used to print a 3D part in a layer by layer manner along a plurality of tool paths within the layer where the print head is carried by a head gantry. Non-limiting examples of print head includes extrusion based liquefiers and screw extruders.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Described herein are embodiments that compensate for position errors of print heads used in additive manufacturing devices, commonly referred to as 3D printers. 3D printers print 3D parts and optionally support structures in a layer-by-layer manner using additive based techniques typically following tool paths within each layer. Non-limiting examples of additive manufacturing systems within the scope of the present disclosure include fused deposition modeling systems, selective laser sintering systems and stereolithographic systems.

Low mass, high acceleration/deceleration head gantries in additive manufacturing systems are desirable relative to high mass, stiff head gantries due to a reduction in cost. However, low mass, high acceleration/deceleration head gantries are more prone to positioning errors of the print head(s) such as errors in pitch, roll and yaw relative to higher mass gantries. Acceleration and deceleration of the print head is one cause of pitch, roll and/or yaw misalignments relative to desired positions for printing a layer of the 3D part.

For example, while head gantries that utilize timing belts provide accurate positioning metrology when under constant uniform tension, timing belts will stretch and vibrate under variable tension, such as when the print head(s) are accelerating or decelerating which can cause positioning errors. In addition, torques can be generated on the print head by umbilical attachments such as but not limited to power and control system wiring and material supply tubes, a location of a center of mass of the print head relative to the head gantry and/or drag of a tip against the 3D part being printed while extruding material that can cause positioning errors in pitch, roll and/or yaw.

The embodiments described herein measure the instantaneous rotational velocities of the print head(s) using an accelerometer and gyroscope sensors attached to the print head. The accelerometer and gyroscope provide signals indicative of rotational position errors that can be utilized in a control system to control actuator(s) that cause the movement of the print head relative to the head gantry and the head gantry within the additive manufacturing system to compensate for positioning errors. In other embodiments, the position error can be utilized as a training tool to increase the accuracy of the print head position in an open loop manner. While an accelerometer is disclosed and discussed herein, any sensor capable of providing a signal that is directly or indirectly related to acceleration/deceleration of the print head(s) can be utilized including a displacement sensor and a velocity sensor where a control system can be configured to correlate the signal to acceleration or deceleration.

Figure 1:
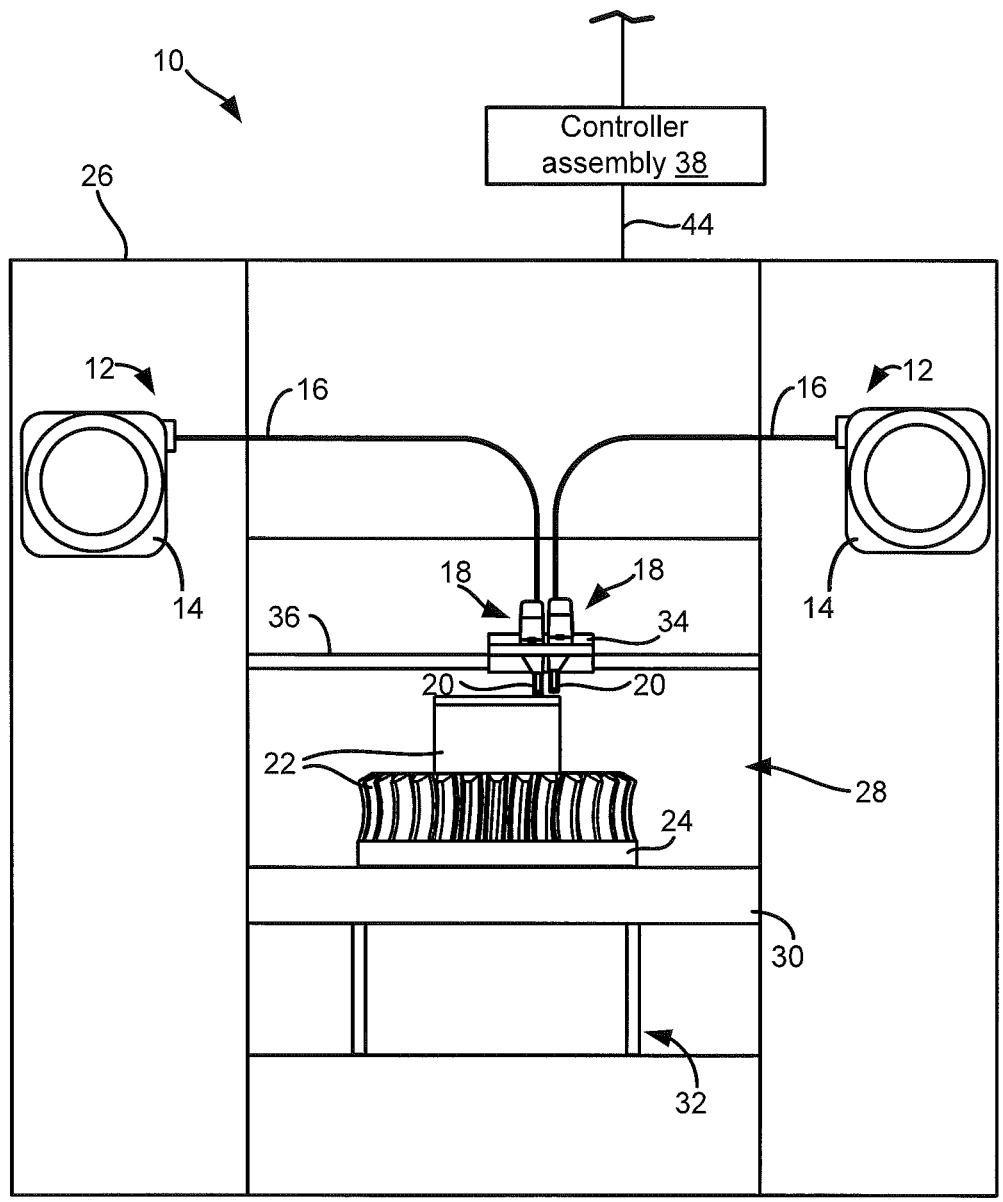
FIG. 1 is a schematic diagram of an additive manufacturing system configured to print 3D parts and support structures by compensating for position error of the print head as described in the present disclosure.

The compensation technique for rotational position error of the print head(s) may be used with any suitable extrusion-based additive manufacturing system or device. For example, FIG. 1 schematically illustrates a fused deposition modeling additive manufacturing system or device 10 with two consumable assemblies 12, where each consumable assembly 12 includes an easily loadable, removable, and replaceable container that retains a supply of a consumable filament or feedstock for printing with system or device 10. Typically, one of the consumable assemblies or first consumable assembly 12 contains a part material filament, and the other consumable assembly or second consumable assembly 12 contains a support material filament. However, both consumable assemblies 12 may be identical in structure, and in the second consumable assembly 12 may contain a second model material. Each consumable assembly 12 may retain a supply of consumable filament on a wound spool, a spool-less coil, or other supply arrangement, such as discussed in Swanson et al., U.S. Pat. No. 7,374,712; Taatjes at al., U.S. Pat. No. 7,938,356; and Mannella et al., U.S. Pat. Nos. 8,985,497 and 9,073,263. Likewise, device 10 may be configured to include any number of consumable assemblies 12.

While a fused deposition modeling system 10 is disclosed and discussed herein, the present disclosure is not limited to a fused deposition modeling system. Rather, the present disclosure can be utilized with any print head that is carried by a head gantry.

Each consumable assembly 12 includes a container portion or supply 14 that holds a supply of consumable filament material, a guide tube 16, a print head 18 and a liquefier assembly 20 where the filament material is received and heated to extrusion temperatures (i.e., molten temperatures) for extruding the filament material into flowable state. Container portion 14 may retain the spool or coil of a supply of consumable filament. In other embodiments, container portions 14 of consumable assemblies 12 may retain large supplies of the consumable filaments. This is particularly suitable for use in a printing farm of automated systems 10 to increase the duration between change-overs of each consumable supply 12.

Each guide tube (or each of first and second guide tubes) 16 provides enclosed paths for interconnecting container portion 14 and print head 18, where a drive mechanism of print head 18 (or of system 10) draws successive segments of the consumable filament from container portion 14, through guide tube 16, to liquefier assembly (or each of first and second liquefier assemblies) 20 of print head 18. In one embodiment, guide tube 16 and print head 18 may be components of system 10, rather than a sub-component of consumable assemblies 12. In other embodiments, guide tube 16 and print head 18 are sub-components of consumable assembly 12, and may be interchanged to and from system 10 with each consumable assembly 12.

In an alternative embodiment, a material delivery system can include a pump system where, in a first stage, solid material is fed to a screw pump by a first drive motor and material is melted by a liquefier to provide build material in a flowable state. The screw pump or screw extruder includes a housing that at least partially defines a barrel, the liquefier intersects the barrel and an impeller extends at least partially through the barrel. After the liquefier melts the solid material, and in a second stage, another drive motor rotates the impeller of the screw pump to extrude the melted material.

Exemplary system 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn.

As shown, system 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive container portions 14 of consumable assemblies 12. In alternative embodiments, the container bays may be omitted to reduce the overall footprint of system 10. In these embodiments, container portions 14 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18, and is supported by head gantry 36. In the shown embodiment, head carriage 34 retains each print head 18 in a manner that prevents or restricts movement of the print head 18 relative to head carriage 34 in the X-Y build plane, but allows the print head 18 to be controllably moved out of the X-Y build plane (e.g., servoed, toggled, or otherwise switched in a pivoting manner). In some instances, the print head 18 can be moved into and out of the X-Y build plane in a controlled manner with an actuator, such as a voice coil actuator, such as is disclosed in Swanson U.S. Pat. No. 9,238,329 When in active or extruding state, print head 18 is secured in each of the Z, Y and Z planes. When in passive or non-extruding state, print head 18 is moved through the Z plane in an arcuate path by changing pitch of print head 18. In further embodiments, print heads 18 and corresponding head carriage 34 may optionally have different configurations. For example, print heads 18 and head carriage 34 may be integrated as a single unit and a different number of print heads may be used.

In the shown embodiment, head gantry 36 is a robotic mechanism configured to move head carriage 34 (and the retained print heads 18) in (or substantially in) a horizontal X-Y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), capstans, pulleys, belts, screws, robotic arms, and the like.

Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of system 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, chamber 28 (e.g., with or without a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10, such as an actuator form moving the print head 18 into and out of the build plane. While illustrated as a single signal line, communication line 44 may include one or more electrical, optical, and/or wireless signal lines, which may be external and/or internal to system 10, allowing controller assembly 38 to communicate with various components of system 10.

During operation, additive manufacturing system 10 typically slices a prescribed part geometry to be built where each slice utilizes a sequence of toolpaths for a print head or energy source. The slices with the tool paths are then utilized to form layers with the print head over time as $\overline{X}_{toolpath}(t)$. A print head 18 is manipulated in space with respect to a part build plane, which is typically the x-y plane and in a z direction that is substantially normal to the build plane. Typically, the movement of the print head 18 is either open loop, or is parameterized by remote encoders. In either control scheme, controller 38 infers the time dependent location of the deposition tip in the gantry frame with the following equation.

$$\overline{X}_{gantry}(t)=(x_{encoder}(t),y_{encoder}(t),z_{encoder}(t)) \quad \text{(Equation 1)}$$

For example, the encoders may count a number of microsteps of a stepper motor in an open loop control system. By coordinating the material deposition rate with the position determined by the encoder, controller 38 can create an accurate part utilizing additive manufacturing techniques. In particular, controller 38 may direct platen gantry 32 to move platen 30 to a predetermined location within a print environment. Controller 38 may then direct head gantry 36 to move head carriage 34 (and the retained print heads 18) around in the print plane. Controller 38 may also direct print heads 18 to selectively draw successive segments of the consumable filaments from container portions 14 and through guide tubes 16, respectively. While a stepper motor is disclosed, any suitable actuator(s) can be utilized to move the print head 18 in space.

Figure 2:
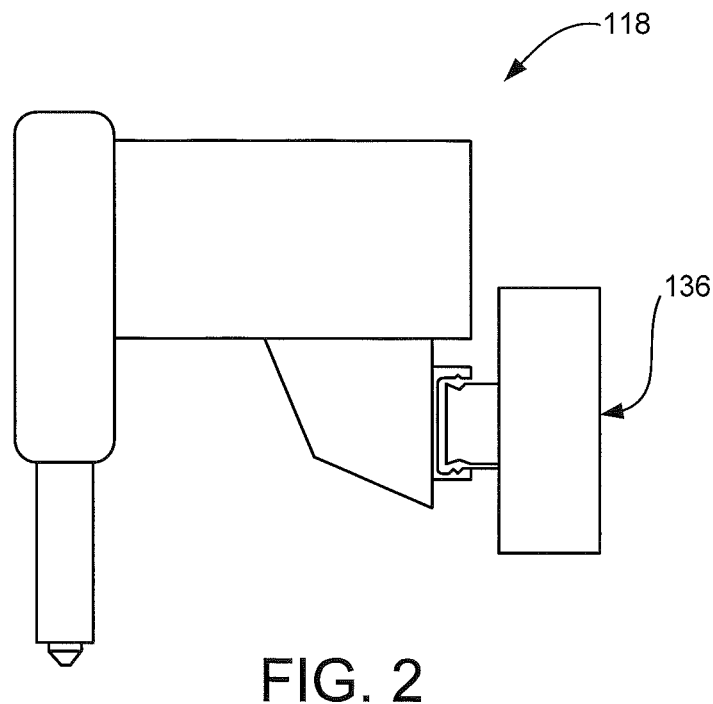
FIG. 2 is a simplified illustration of a side view of a print head mounted to a head carriage that is mounted to a gantry in the prior art, where the gantry is stationary.

FIG. 2 is a simplified illustration of a side view of print head 118 mounted to a head carriage that is mounted to head gantry 136 in the prior art. In FIG. 2, head gantry 136 is stationary and therefore print head 118 is unaffected by positioning error. In other words, in the absence of external forces including, but not limited to, drag of the nozzle tip on a part, drive belt vibrations, oven louver pressure, position dependent drag from bearings, stiction, and head deflection by the extrudate and inertial forces including, but not limited to, torques on the extrusion head, belt stretch, bridge racking, head mount flexing, resonant vibrations driven by specific toolpath geometries), $\overline{X}_{gantry}(t)$ correctly reflects the FIG. 2 extrusion tip position.

Figure 3:
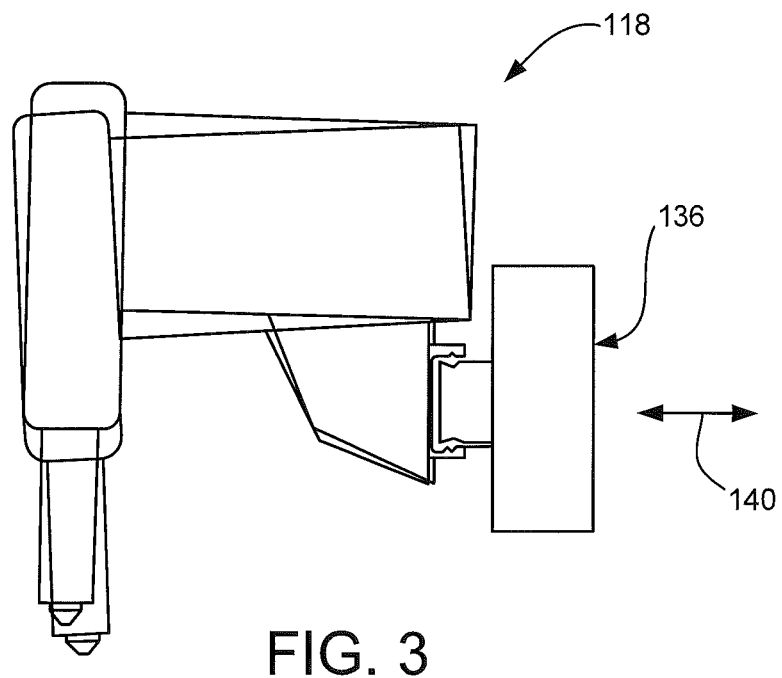
FIG. 3 is a simplified illustration of a side view of the print head of FIG. 2 mounted to a head carriage that is mounted to the gantry in the prior art, where the gantry is accelerating.

FIG. 3 illustrates print head 118 and head gantry 136 of FIG. 2, but with head gantry 136 accelerating in the directions indicated by arrows 140. As illustrated in FIG. 3, print head 118 is affected by positioning error(s) caused by external and inertial forces. These forces affect the position of the print head 118 $\overline{X}_{gantry}(t)$ in complex and sometimes unexpectable ways. The external forces on the print head 118 can cause the position of the print head 118 to become unknown to controller 38 which can result in numerous problems with the quality of the printed part including, but not limited to, low ultimate part strength, geometric fiducial errors in the printed 3D part, collisions of the 3D part being printed with the print head, and mixing of part and support material being printed in a build plane.

For example, a typical fused deposition model extrusion tip extends roughly three inches below and in front of its mounting block. A rotation of 333 µradians (i.e., 0.0001"/3") is enough to have a perceptible effect on the XY position of the deposition, while a rotation of 67 µradians (i.e., 0.0002"/3") is sufficient to affect the adhesion of adjacent part layers in the Z direction. A typical way to address these forces is to make a gantry that is sufficiently strong and stiff that the perturbations to $\overline{X}_{gantry}(t)$ become negligibly small. For example, gantries (i.e. positioning systems) that resist rotations of this size when accelerating 1 g or more tend to be heavy and expensive. In these cases, it is generally true that $\overline{X}_{gantry}(t) \sim \overline{X}_{toolpath}(t)$ to sufficient accuracy. However, economic pressures that mandate a low cost additive manufacturing system that utilize a low mass gantry due to cost make these position errors significant.

Figure 4:
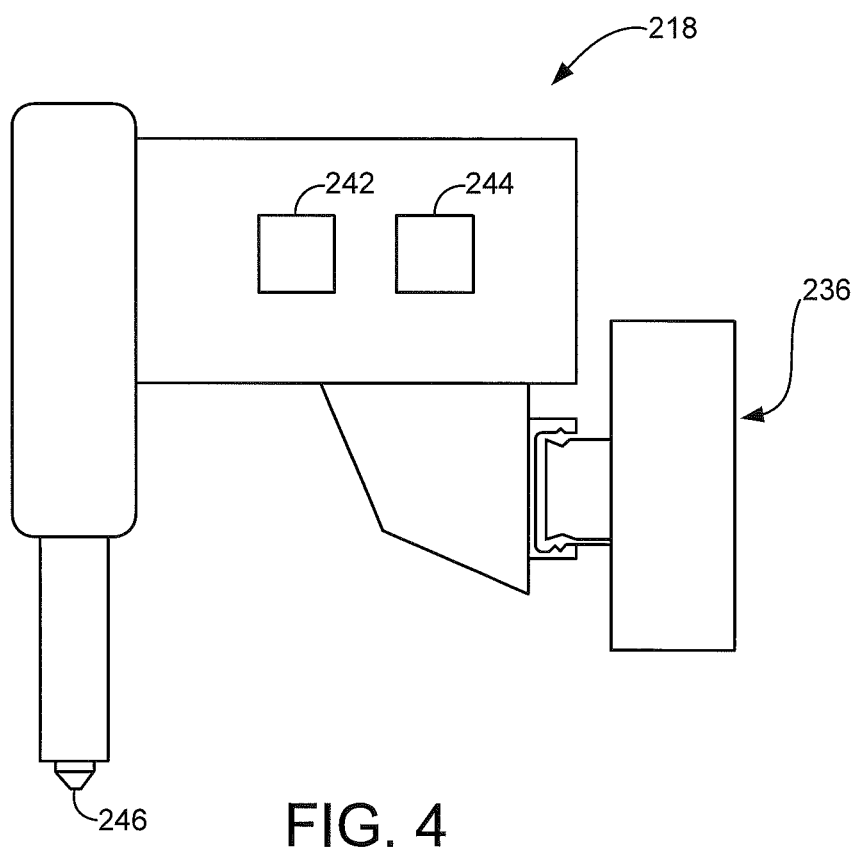
FIG. 4 is a simplified illustration of a side view of a print head with sensors mounted to head gantry according to one embodiment.

FIG. 4 is a simplified illustration of a side view of a print head 218' mounted to head gantry 236 according to one embodiment. Mounted to print head 218 are sensors 242 and 244. Sensor 242 is a three axis accelerometer that can measure acceleration (i.e., g-force) and sensor 244 is a three axis gyroscope that can measure orientation and recognize movement in three dimensional space. As illustrated, because accelerometer 242 and gyroscope 244 are rigidly or fixedly mounted to print head 218, the relative locations of extrusion tip 246, the center of mass of print head 218, accelerometer 242 and gyroscope 244 are fixed in a local coordinate system. While a three axis accelerometer is illustrated and described, any sensor capable of providing a signal that is directly or indirectly related to acceleration/deceleration of the print head(s) can be utilized including a displacement sensor and a velocity sensor where a control system can be configured to correlate the signal to acceleration or deceleration.

Since torque is spatially invariant, gyroscope 244 is capable of determining the rotary accelerations of extrusion tip 246 by the following equation.

$$\ddot{\overline{\varnothing}}_{tip}(t)=\ddot{\overline{\varnothing}}_{gyro}(t)=(\ddot{\phi}_x(t),\ddot{\phi}_y(t),\ddot{\phi}_z(t)) \quad \text{(Equation 2)}$$

In Equation 2, the rotary accelerations are with respect to X, Y, Z axes in the print head frame). $\ddot{\phi}_j(t)$ is the angular acceleration measured about the $j^{th}$ axis in the deposition frame. Knowing the displacement between extrusion tip 246 and accelerometer 242 in the extruder frame, $\overline{X}_{disp}=(x_{disp}, y_{disp}, z_{disp})$, the output of accelerometer 242, $\ddot{\overline{X}}_{accel}(t)=(\ddot{x}_{accel}, \ddot{y}_{accel}, \ddot{z}_{accel})$, and the cross product of $\overline{X}_{disp}$ and $\ddot{\overline{\varnothing}}_{gyro}(t)$ gives the acceleration of extrusion tip 246 as:

$$\ddot{\overline{X}}_{tip\_measured}(t)=\ddot{\overline{X}}_{accel}(t)+\overline{X}_{disp}\times\ddot{\overline{\varnothing}}_{gyro}(t) \quad \text{(Equation 3)}$$

Therefore, gyroscope 244 effectively allows accelerometer 242 to be displaced a distance from extrusion tip 246 while still being able to determine the accelerations of extrusion tip 246.

Figure 5:
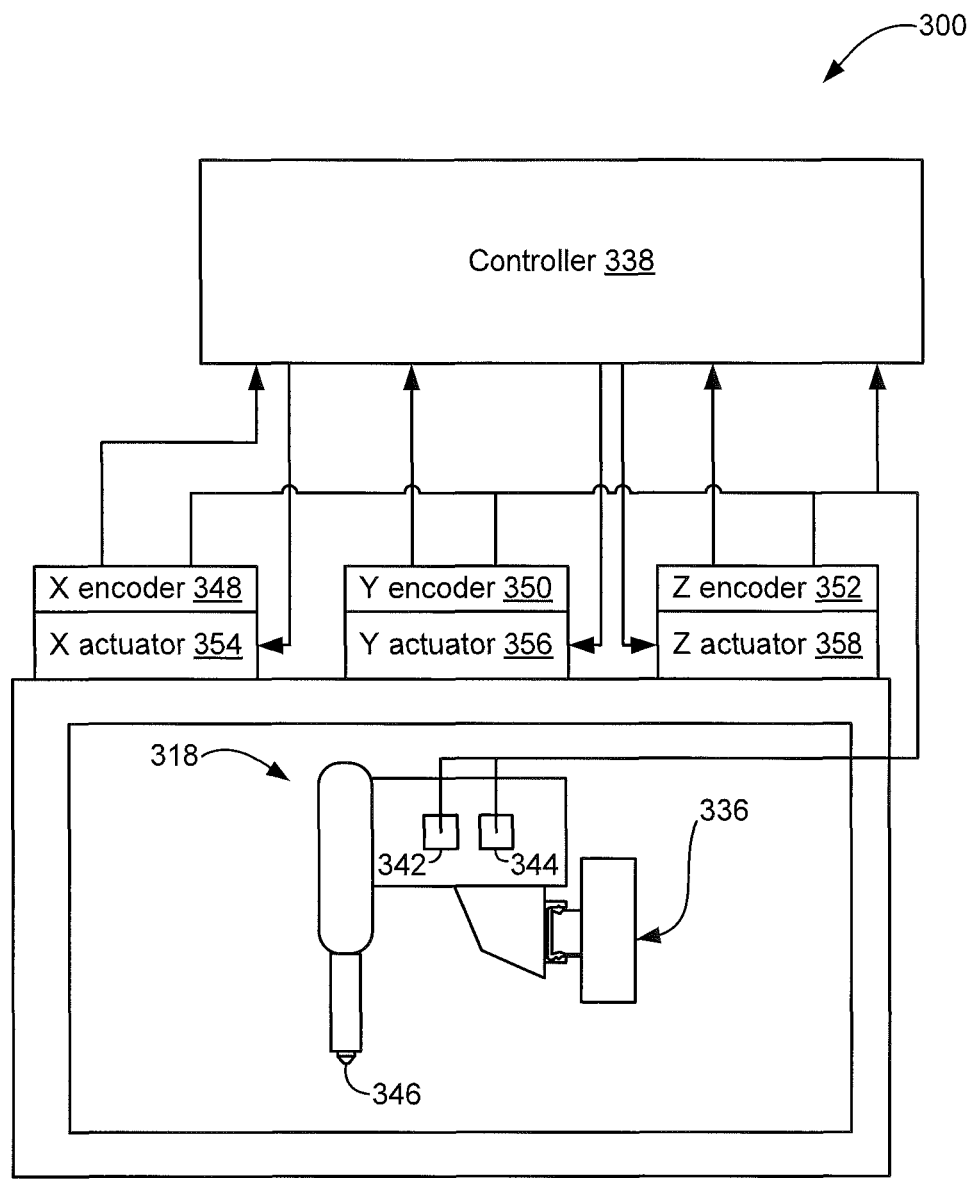
FIG. 5 is a schematic block diagram of an additive manufacturing system that is configured to compensate for measured position errors of print head according to one embodiment.

FIG. 5 is a schematic block diagram of an additive manufacturing system 300 that is configured to compensate for measured position errors in a print head 318 according to one embodiment. In this embodiment, the output derived from accelerometer 342 and gyroscope 344 can be combined with the typical X, Y, Z encoder data to create modified X', Y' and Z' encoder signals for compensating rotational position errors of print head 318. In particular, X, Y and Z encoders 348, 350 and 352 are in communication with X, Y and Z actuators 354, 356 and 348, respectively, determine the low frequency kinematics of the moving mass (i.e., the head gantry 336). Accelerometer 342 in combination with gyroscope 344 determines the high frequency motion of head gantry 336.

A typical X, Y and Z actuator 354, 356 and 358 is an electric motor. However, other actuators are within the scope of the present disclosure including linear electric actuators for the X and Y actuators 354 and 356 and voice coil mechanisms for the Z actuator 358.

In particular, $\bar{X}_{tip\_measured}(t)$ defined in Equation 3 is merged by controller 338 with the signals from encoders 348, 350 and 352 to obtain a real time position of head gantry 336. This can be done by applying a high-pass filter to the mass position ($\bar{X}_{tip\_measured}$ (t)) to determine a mass deflection, applying a low-pass filter to the position computed by the encoders 348, 350 and 352 (i.e., $\bar{X}_{gantry}(t)$) to get an actuator position and summing the high-frequency-passed value of $\bar{X}_{tip\_measured}$ (t) with the low-frequency-passed value of $\bar{X}_{gantry}(t)$ together. Controller 338 then compensates the distortion of print head 318 using the resulting modified X', Y' and Z' relative to encoder signals.

Figure 6:
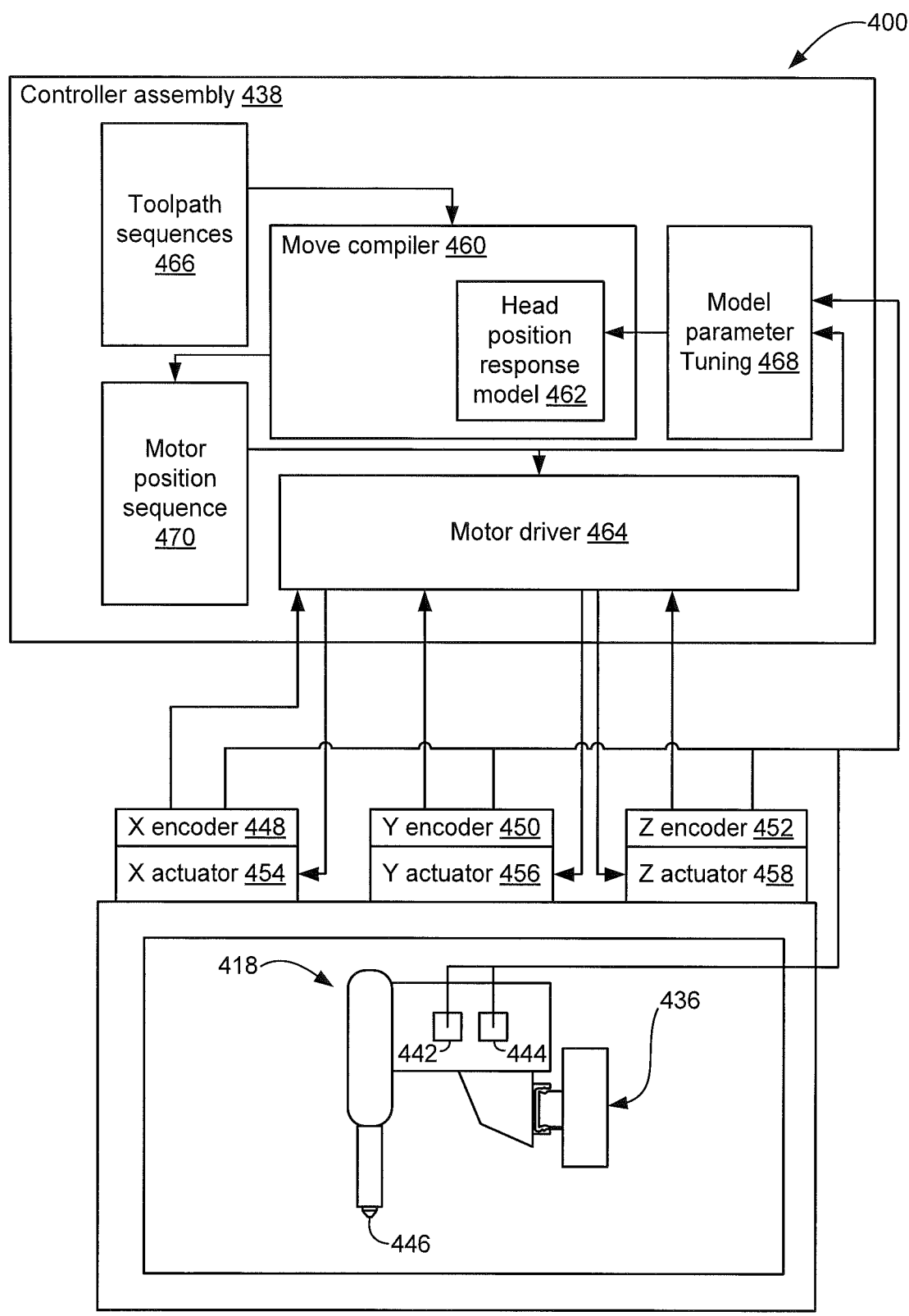
FIG. 6 is a schematic block diagram of an additive manufacturing system that compensates for measured position errors of a print head according to another embodiment.

FIG. 6 is a schematic block diagram of an additive manufacturing system 400 that compensates for distortion in a print head 418 according to another embodiment. In FIG. 6, the output derived from accelerometer 442 and gyroscope 444 are used as training data for parameters in a move compiler 460 of a controller assembly 438. Move compiler 460 includes a head position response model 462 and is capable of predicting the extrusion tip 446 positioning errors, and based on these model predictions, predictively adjusts the trajectories commanded to gantry 436 so as to force actuators (X, Y and Z actuators) 454, 456 and 458 using actuator controller 464 and therefore extrusion tip 446 to follow the desire path in an open loop manner. It should be realized that actuators 454, 456 and 458 can also be driven by actuator controller 464 to follow the pre-distorted trajectories in a closed loop manner. This system of predicting extrusion tip 446 distortions and pre-distorting the trajectories based on those predictions reduces the bandwidth required of system 400, which is also a requirement for a low cost gantry.

As previously discussed, during operation, additive manufacturing system 400 slices a prescribed part geometry to be built into layers having a sequence of toolpaths stored in toolpath sequences 466 for print head 418. These toolpath sequences are to be executed over time as $\bar{X}_{toolpath}$ (t). Print head 418 is manipulated in space with respect to a part build plane (typically in X, Y) and in some instances optionally Z. That motion can be either an open loop control system or is parameterized by remote encoders 448, 450 and 452. In either case, controller 438 infers the time dependent location of extrusion tip 446 in the gantry 436 frame as $\bar{X}_{gantry}(t)=(x_{encoder}(t), y_{encoder}(t), z_{encoder}(t))$. In FIG. 5, a modified X', Y' and Z' encoder signals are created for compensating for location distortion of print head 418. In the FIG. 6 embodiment, these modified encoder signals are created in model parameter tuning 468 using the output from accelerometer 442 and gyroscope 444 to determine $\bar{X}_{tip\_measured}(t)$ as described above and merging the $\bar{X}_{tip\_measured}(t)$ with signals from encoders 448, 450 and 452.

The resulting real time position of head gantry 436 is fed to head position response model 462 of move compiler 460. Using a toolpath sequence from toolpath sequences 466 and combining with the head position response model 462, move compiler 460 sends predicted pre-distortion information to actuator position sequence 470 for changes. These changes are provided to actuator controller 464 for controlling the position of print head 418.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

The invention claimed is:

1. A 3D printer comprising:
a print head configured to form layers of a 3D part;
a head gantry carrying the print head and configured to operably move the print head along tool paths;
at least one head gantry actuator coupled to the head gantry and configured to move the print head in a plane;
a print head actuator coupled to the print head and configured to move the print head in a direction substantially orthogonal to the plane;
a sensor fixedly mounted to the print head and configured to output a first signal that is directly or indirectly related to an acceleration of the print head;
a gyroscope fixedly mounted to the print head and configured to output a second signal related to a rotational position of the print head; and
a controller configured to determine a rotational position error of the print head in real time relative to a predetermined position based on the first signal and the second signal and to output one or more signals to the at least one head gantry actuator and/or the print head actuator using real time feedback control to compensate for the rotational position error of the print head.

2. The 3D printer of claim 1 and wherein the sensor comprises an accelerometer.

3. The 3D printer of claim 2 and wherein the accelerometer comprises a three axis accelerometer.

4. The 3D printer of claim 1 and wherein the gyroscope comprises an electronic three axis gyroscope.

5. The 3D printer of claim 4, wherein the controller is configured to determine the rotational position error of the extrusion tip by multiplying the first signal with a cross product of the first signal and the second signal.

6. The 3D printer of claim 1 and wherein the print head comprises a liquefier having an extrusion tip located a distance from the plane wherein the liquefier is configured to heat a feedstock material to a molten state such that the molten material flows through the extrusion tip to form the layers of the 3D part.

7. The 3D printer of claim 1 and wherein the at least one head gantry actuator comprises a plurality of head gantry actuators.

8. The 3D printer of claim 7 and wherein the plurality of gantry actuators comprises a plurality of motors.

9. The 3D printer of claim 7 further comprising a plurality of encoders, wherein each encoder is in communication with at least one of the plurality of head gantry actuators and the print head actuator wherein each of the plurality of encoders is configured to output a signal to the controller indicative of the predetermined position of the print head.

10. A 3D printer comprising:
a print head configured to form layers of a 3D part based upon a sliced 3D model wherein a planar slice of the 3D model includes one or more planar tool paths;
a head gantry carrying the print head and configured to operably move the print head along the planar tool paths;
at least one head gantry actuator coupled to the head gantry and configured receive first signals to move the print head in the plane;
a print head actuator coupled to the print head and configured to receive second signals to move the print head in a direction substantially orthogonal to the plane;
a sensor fixedly mounted to the print head and configured to output a first signal that is directly or indirectly related to an acceleration of the print head;
a gyroscope fixedly mounted to the print head and configured to output a second signal related to a rotational position of the print head; and
a controller configured to:
receive the first and second signals and determine a rotational position error of the print head in real time relative to a predetermined position based upon the one or more tool paths in the slice of the 3D model;
output the rotational position error to a compiler that utilizes the rotational position error to modify the first signal to the at least one head gantry actuator and the second signal to the print head actuator to minimize rotational position errors of the print head when another 3D part is printed utilizing the 3D model; and
output one or more signals to the at least one head gantry actuator and/or the print head actuator using real time feedback control to compensate for the rotational position error of the print head of the 3D part being printed.

11. The 3D printer of claim 10 and wherein the sensor comprises an accelerometer.

12. The 3D printer of claim 11 and wherein the accelerometer comprises a three axis accelerometer.

13. The 3D printer of claim 10 and wherein the gyroscope comprises an electronic three axis gyroscope.

14. The 3D printer of claim 10 and wherein the print head comprises a liquefier having an extrusion tip located a distance from the plane wherein the liquefier is configured to heat a feedstock material to a molten state such that the molten material flows through the extrusion tip to form the layers of the 3D part.

15. The 3D printer of claim 14, wherein the controller is configured to determine the rotational position error of the extrusion tip by multiplying the first signal with a cross product of the first signal and the second signal.

16. The 3D printer of claim 10 and wherein the at least one head gantry actuator comprises a plurality of head gantry actuators.

17. The 3D printer of claim 16 and wherein the plurality of gantry actuators comprises a plurality of motors.

18. The 3D printer of claim 10 further comprising a plurality of encoders, wherein each encoder is in communication with one of the plurality of head gantry actuators and the print head actuator wherein each of the plurality of encoders is configured to output a signal to the controller indicative of the predetermined position of the print head.

* * * * *